US011707922B2

(12) United States Patent
Ginosatis

(10) Patent No.: US 11,707,922 B2
(45) Date of Patent: Jul. 25, 2023

(54) THIN FILM FOR WASTE PACKING CASSETTES

(71) Applicant: FLEXOPACK S.A., Koropi (GR)

(72) Inventor: Dimitris Ginosatis, Koropi Attica (GR)

(73) Assignee: Flexopack S.A., Koropi (GR)

( * ) Notice: Subject to any disclaimer, the term of this patent is extended or adjusted under 35 U.S.C. 154(b) by 0 days.

(21) Appl. No.: 17/171,415

(22) Filed: Feb. 9, 2021

(65) Prior Publication Data
US 2022/0194062 A1 Jun. 23, 2022

(30) Foreign Application Priority Data
Dec. 17, 2020 (EP) .................................... 20215130

(51) Int. Cl.
B32B 27/08 (2006.01)
B32B 27/30 (2006.01)
B32B 27/32 (2006.01)
B32B 27/34 (2006.01)
B32B 27/36 (2006.01)

(52) U.S. Cl.
CPC ............ B32B 27/08 (2013.01); B32B 27/306 (2013.01); B32B 27/32 (2013.01); B32B 27/34 (2013.01); B32B 27/36 (2013.01); B32B 2250/05 (2013.01); B32B 2323/043 (2013.01); B32B 2553/00 (2013.01)

(58) Field of Classification Search
CPC ....... B32B 27/08; B32B 27/306; B32B 27/32; B32B 27/34; B32B 27/36; B32B 2250/05; B32B 2323/043; B32B 2553/00
See application file for complete search history.

(56) References Cited

U.S. PATENT DOCUMENTS

| 3,536,192 | A | 10/1970 | Couper et al. | |
|---|---|---|---|---|
| 4,934,529 | A | 6/1990 | Richards et al. | |
| 4,973,625 | A | 11/1990 | Deyrup | |
| 5,037,370 | A | 8/1991 | Sundberg | |
| 9,290,320 | B2 | 3/2016 | Gkinosatis | |
| 9,440,788 | B2 | 9/2016 | Gkinosatis | |
| 9,604,430 | B2 | 3/2017 | Gkinosatis | |
| 2003/0131569 | A1 | 7/2003 | Chomik et al. | |
| 2003/0218022 | A1* | 11/2003 | Chomik | B65F 7/00 220/495.02 |
| 2004/0157077 | A1 | 8/2004 | Roussos | |
| 2005/0064123 | A1 | 3/2005 | Chomik et al. | |
| 2009/0191392 | A1 | 7/2009 | Gkinosatis | |
| 2011/0159263 | A1* | 6/2011 | Gkinosatis | B32B 27/32 428/219 |
| 2013/0227916 | A1 | 9/2013 | Gkinosatis | |
| 2015/0210454 | A1 | 7/2015 | Gkinosatis | |
| 2015/0231861 | A1* | 8/2015 | Hu | B32B 37/00 428/213 |
| 2016/0114974 | A1* | 4/2016 | Kurihara | B32B 27/20 383/71 |
| 2016/0236862 | A1 | 8/2016 | Gkinosatis | |
| 2016/0250829 | A1 | 9/2016 | Luehn | |
| 2019/0118510 | A1* | 4/2019 | Ginosatis | B32B 7/06 |
| 2019/0224952 | A1 | 7/2019 | Clare | |
| 2020/0122439 | A1 | 4/2020 | Grefenstein et al. | |
| 2021/0245478 | A1 | 8/2021 | Ginosatis | |

FOREIGN PATENT DOCUMENTS

| CA | 2509518 | 12/2005 |
|---|---|---|
| DE | 202011110798 U1 | 9/2016 |
| DE | 202020005283 U1 | 6/2021 |
| EP | 0339989 | 11/1989 |
| EP | 1300238 | 4/2003 |
| EP | 2085216 | 8/2009 |
| EP | 2332723 | 6/2011 |
| EP | 2468661 | 6/2012 |
| EP | 2626202 | 8/2013 |
| EP | 3260291 | 12/2017 |
| EP | 3473433 | 4/2019 |
| FR | 2953162 A1 | 6/2011 |
| FR | 3048380 A1 | 9/2017 |
| GB | 2475961 | 6/2011 |
| GB | 2518712 | 4/2015 |
| JP | 2002068283 A | 3/2002 |
| WO | WO 98/36903 A1 | 8/1998 |
| WO | WO 2017/207221 A1 | 12/2017 |
| WO | WO 2019/172932 A1 | 9/2019 |
| WO | WO 2019/231442 A1 | 12/2019 |

OTHER PUBLICATIONS

Examination Report corresponding to AU Patent Application Serial No. 2021201215 dated Apr. 11, 2022.
Examination Report corresponding to DE Patent Application Serial No. 10 2021 200 304.4 dated Sep. 1, 2021.
Office Action corresponding to DK Patent Application Serial No. PA 2021 70079 dated Dec. 10, 2021.
Office Action corresponding to DK Patent Application Serial No. PA 2021 70079 dated May 11, 2022.
Search Report corresponding to EP Patent Application Serial No. 20215130.4 dated May 14, 2021.
Examination Report corresponding to ES Patent Application Serial No. 202131155 dated Mar. 4, 2022.
Search Report corresponding to FR Patent Application Serial No. 2100963 dated May 23, 2022.
Written Opinion corresponding to FR Patent Application Serial No. 2100963 dated May 23, 2022.
Search Report corresponding to NL Patent Application Serial No. 2027313 dated Jan. 25, 2022.
Office Action corresponding to European Application No. 2021513041107 dated Mar. 31, 2023.
Examination Report corresponding to NZ Patent Application Serial No. 772827 dated Mar. 30, 2023.

* cited by examiner

Primary Examiner — Michael C Miggins
(74) Attorney, Agent, or Firm — Jenkins, Wilson, Taylor & Hunt, P.A.

(57) ABSTRACT

The present invention refers to a polymeric film comprising odor barrier material and being able to pack malodorous waste.

37 Claims, No Drawings

THIN FILM FOR WASTE PACKING CASSETTES

RELATED APPLICATIONS

This application claims the benefit of European Patent Application No. 20215130.4, filed Dec. 17, 2020, the disclosure of which is incorporated herein by reference in its entirety.

TECHNICAL FIELD

The present invention relates to a multilayer film for use in malodorous item packaging.

BACKGROUND

A lot of waste products produce smells that are annoying to the environment. Example are decayed food, kid nappies and cat litter.

In the prior art there are many films that could be used for protection from malodors. As well known in the art, the use of materials like EVOH, PVDC, polyacrylonitrile is recommended in order to not allow malodors escape from the container (e.g. bag or another configuration) and create an unpleasant atmosphere.

There are also a lot of known configurations of packing a certain length of film (e.g. 20 meters) in a compressed form (e.g. in a cassette). Examples of the representative cassettes are shown in U.S. Pat. No. 4,934,529 or U.S. Pat. No. 3,536,192.

Generally, the cassette comprises a tubular core, casing wall and cassette bottom. The film is pulled through the area between the lid of the cassette and the casing wall. The flexible tubing is dispensed from the cassette. After the malodorous item is thrown into the bag the core is rotated and the flexible tube is twisted so that it closes as hermetically as possible the waste/environment area.

To dispose the next diaper, the user pulls the next portion of film. The previous hermetically closed diaper is pulled downwards and the new diaper is packed in a new configuration. All these different packs are stored in a bin which is periodically emptied.

Separation of one pack to the other can be done by various means. A rotary knife is preferred.

Film Characteristics

In the prior art a lot of possible film configurations either monolayer or multilayer have been proposed. The basic characteristics a film should have in order to be used in the particular case are
1. Barrier to odors
2. To have the proper deadfold properties so that is compressed efficiently in the cassette.
3. To have sufficient mechanical properties (e.g. tensile strength at break, elongation).

With new environmental rules promoting the concept of "less plastic", it is critical to produce films with lower thickness. At the same time, it is imperative that these films keep excellent barrier and mechanical properties.

Patent application EP2085216 gives an example of production of successful films for this application. However, it is challenging to produce films with lower weight than 14 g/m$^2$ as the bubble stability of the hot blown film is compromised. Further, the use of substantial non resilient material increases the possibility to have increased die lip deposits (die drool).

Further, the use of such materials may not allow the coefficient of friction to go to as low as 0.2 (kinetic coefficient of friction, film to film, ASTMD 1894) which is often desired in such applications.

For example, films according to EP2085216 have kinetic coefficient of friction (film to film and measured as per ASTM D1894) of more than 0.30 which creates serious issues during filling of the cassettes or in the use of the film or cassette by the consumer.

Further, the films according to EP2085216 cannot be downgaged easily to as thin as 10 g/m2 which is a desirable effect for environmental reasons as long as mechanical properties are adequate.

We have surprisingly found that all the features required for such application can be achieved with a very lightweight multilayer film with a weight of less than 20 g/m$^2$. This is extremely beneficial for the environment as multilayer films are extremely difficult to be produced with so small weight per surface.

SUMMARY

In a first aspect the invention is directed to a multilayer film with weight less than 20g/m$^2$ for use in malodorous item packaging, wherein the film comprises two outer layers, wherein at least one of the outer layers comprise at least 50% per weight high density polyethylene (HDPE) based on the total weight of the corresponding layer and wherein the film comprises at least one barrier layer comprising a polymer selected from polyamide, polyester and/or EVOH.

In a further aspect of the invention both outer layers comprise at least 50% per weight high density polyethylene (HDPE).

The multilayer preferably comprises in the barrier layer EVOH.

The multilayer film preferably does not contain polypropylene.

The total amount of substantially non-resilient material in the multiplayer film is preferably 30% per weight or less, more preferably 25% per weight or less, even more preferably 20% per weight or less.

The total amount of substantially non-resilient material in each outer layer is preferably 50% per weight or less, more preferably 40% per weight or less, even more preferably 30% per weight or less.

According to a preferred the multilayer film has a weight less than 18 g/m$^2$, preferably less than 17 g/m$^2$, more preferably less than 16 g/m$^2$, even more preferably less than 15 g/m$^2$, most preferably less than 14 g/m$^2$, and in particular less than 13 g/m$^2$.

Preferably, the weight of each outer layer in the multilayer film is less than 8 g/m$^2$, more preferable less than 6 g/m$^2$, most preferably less than 5 g/m$^2$.

Preferably, the HDPE is in blend with an ethylene alpha olefin copolymer, preferably hexene or octene copolymer.

The HDPE comprised in at least one of the two outer layers has preferably a density of at least 0.940 g/cm$^3$, more preferable at least 0.945, more preferably at least 0.950.

In a preferred embodiment the multilayer film further comprises at least one intermediate layer comprising polyamide, preferably the polyamide is polyamide 6 or polyamide 6/66.

In a preferred embodiment of the multilayer film at least one or both of the outer layer comprise a slip agent, preferably, the slip agent is an amide-based slip agent.

In the multilayer film of the present invention both outer layers have a kinetic film-to-film coefficient of friction of less than 0.35 measured according to ASTMD1894, preferably the coefficient of friction is less than 0.30, more preferably the coefficient of friction is less than 0.25, even more preferably less than 0.2.

In a preferred embodiment the multilayer film comprises, preferably consists of the following layers:
OUTER LAYER/INTERMEDIATE LAYER 1/BARRIER LAYER/INTERMEDIATE LAYER 3/OUTER LAYER
Wherein INTERMEDIATE LAYER 1 and 3 can comprise the same or different materials.

In a further preferred embodiment, the multilayer film comprises, preferably consists of the following layers:
OUTER LAYER/INTERMEDIATE LAYER 1/INTERMEDIATE LAYER 2/BARRIER LAYER/INTERMEDIATE LAYER 3/INTERMEDIATE LAYER 4/OUTER LAYER
Wherein each of INTERMEDIATE LAYER 1-4 can comprise the same or different materials.

In a preferred embodiment the multilayer film presents an antibacterial activity characterized by a decline of at least 20% of the population of Staphylococcus aureus held in contact with at least one of the outer layers of the film for 24 hours compared to the initial population, measured according to ISO 2196/2011 for measurement of the antibacterial activity on plastics and other non-porous surfaces.

In a preferred embodiment the multilayer film at least one of the outer layers, preferably both outer layers, additionally comprise 0.5-40% per weight, preferably 5-30% per weight low density polyethylene (LDPE) based on the total weight of the corresponding outer layer.

According to a second aspect a cassette is provided comprising a multilayer film according to the present invention.

A third aspect of the invention related to the use of a multilayer film according to the present invention for waste packing.

Preferably, the film is stored in a cassette.

In a preferred embodiment the film is folded or the film is in the form of a bag.

Definitions:

In this application the following definitions are used:

The term "film" refers to a flat or tubular flexible structure of thermoplastic material.

The term "heat shrinkable" refers to a film that shrinks at least 10% in at least one of the longitudinal and transverse directions when heated at 90° C. for 4 seconds. The shrinkability is measured in water according to ASTM 2732. For temperatures like 100° C. or more, glycerine is used as a reference liquid.

The term "total heat shrinkability" refers to the sum of heat shrinkability at the MD direction and heat shrinkability at the TD direction. In all cases, ASTM 2732 is used for measurement of shrinkabilities.

The term "multilayer" refers to a film comprising 2 or more layers.

The phrase "longitudinal direction" or "machine direction" herein abbreviated "MD" refers to a direction along the length of the film.

The phrase "outer layer" refers to the film layer which comes in immediate contact with the outside environment. Therefore, the film has two outer layers, and when formed to a pack one of outer layers is inside of the pack and one at the outside of the pack.

The phrase "inner layer" refers to any film layer that is not "outer layer».

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein, the term "polyolefin" refers to any polymerized olefin, which can be linear, branched, cyclic, aliphatic, substituted or unsubstituted. More specifically, included in the term polyolefin are homopolymers of olefin, copolymers of olefin, copolymers of an olefin and a non olefinic comonomer (such as ester) etc.

Specific examples include polyethylene homopolymer, polypropylene homopolymer, polybutene homopolymer, ethylene alpha olefin copolymer, propylene alpha olefin copolymer, butene alpha olefin copolymer, ionomer, ethylene ester copolymer etc.

As used herein the term "polyethylene" identifies polymers consisting essentially of the ethylene repeating unit. The homopolymers of ethylene that have a density more than 0.940 are called high density polyethylene (HDPE), the ones that are have less than 0.940 are low density polyethylene (LDPE).

As used herein the phrase "ethylene alpha olefin copolymer" refers to ethylene-based copolymers like linear low-density polyethylene (LLDPE), medium density polyethylene (MDPE), very low-density polyethylene (VLDPE), ultra-low-density polyethylene (ULDPE), metallocene catalyzed polymers and polyethylene plastomers and elastomers.

As used herein the term "homogeneous ethylene alpha olefin copolymers" refer to ethylene alpha olefin copolymers having a molecular weight distribution less than 2.7 as measured by GPC. Typical examples of these polymers are AFFINITY from DOW or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40%.

As used herein the phrase "ethylene vinyl acetate copolymer" or EVA refer to copolymers of ethylene and vinyl acetate.

As used herein the phrase "ethylene ester copolymer" includes any polymer made from ethylene and ester monomers. It is obvious that this term includes EVAs, EMAs and other polymers.

As used herein the term "barrier polymer" refers to polymers which have the property to limit the passage of oxygen through a film or a layer comprising the polymer. Common materials, are EVOH, PVDC or polyamide.

As used herein, the term EVOH refers to saponified products of ethylene vinyl ester copolymers. The ethylene content is typically in the range of 25 to 50% per mol. All the later references to EVOH ethylene content will be in % per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein the term "polyamide" refers to homopolymers and copolymers. Polyamide 6, polyamide 66, polyamide 12, polyamide 6/66, polyamide 6/12, polyamide elastomers, MXD polyamides and other copolymers are specifically useful for the invention.

As used herein the term "polyester" refers to polymers comprising terephthalate units. Examples of polyesters are PET (polyethylene terephthalate), PBT (polybutylene terephthalate), polyester elastomer (block copolymer comprising ester or ether units), PTT and other similar polymers.

As used herein, the term "ionomer" comprises the copolymers of ethylene and methacrylic or acrylic acid being metal neutralized. An example of such material is Surlyn from Dupont.

As used herein, the term "polypropylene" refers to polymers incorporating propylene structural units in a weight percentage of more than 50% per weight of the total polymer. Examples of these, are homo polypropylenes, random copolymers of propylene and ethylene, block copolymers of propylene and ethylene, copolymers or blends of propylene and rubber (such as blends of polypropylene and ethylene propylene rubber), propylene ethylene alpha olefin terpolymers and others.

These polymers may be isotactic, syndiotactic or atactic. Isotactic is preferred.

As used herein the term "substantially non resilient material" refers to materials or material compounds comprising inorganics like calcium carbonate, titanium dioxide, wollastonite, mica, glass fibers, dolomite, silica and the like.

All measurement methods mentioned herein are readily available for the skilled person. For example, they can be obtained from the American National Standards Institute at: www.webstore.ansi.org All percentages are based on weight per weight ratio, except when otherwise stated.

DETAILED DESCRIPTION OF THE INVENTION

According to a first aspect the present invention is directed to a multilayer film with weight less than 20g/m$^2$ for use in malodorous item packaging, where the film comprises two outer layers comprising ethylene alpha olefin copolymers.

In a preferred embodiment the multilayer film comprises, preferably consists of the following layers:
OUTER LAYER/INTERMEDIATE LAYER 1/INTERMEDIATE LAYER 2/BARRIER LAYER/INTERMEDIATE LAYER 3/INTERMEDIATE LAYER 4/OUTER LAYER Wherein each of INTERMEDIATE LAYER 1-4 can comprise the same or different materials.

In a preferred embodiment the multilayer film comprises, preferably consists of the following layers:
OUTER LAYER/INTERMEDIATE LAYER 1/BARRIER LAYER/INTERMIDIATE LAYER 3/OUTER LAYER Wherein INTERMEDIATE LAYER 1 and 3 can comprise the same or different materials.
Detailed description of layers
Barrier layer Preferably, the multilayer film comprises a barrier layer. In one embodiment the barrier layer comprises EVOH as a barrier material.

The EVOH used preferably has an ethylene content less than 48%, more preferably less than 44%, more preferably less than 38%, more preferably from 27 to 32% ethylene.

In another embodiment the barrier layer comprises polyamide as a barrier material.

The oxygen barrier material preferably has a weight of less than 5 g/m$^2$, more preferably less than 4 g/m$^2$, even more preferably less than 2.5 g/m$^2$.

Outer Layers

The outer layer comprises preferably at least 50% per weight high density polyethylene (HDPE). In a preferred version, both outer layer comprises at least 50% per weight high density polyethylene (HDPE).

In a preferred embodiment the HDPE is used in blend with ethylene alpha olefin copolymer, preferably hexene or octene copolymer.

In a further preferred embodiment at least one of the outer layers, preferably both outer layers, additionally comprises 0.5-40%, preferably 5-30% per weight low density polyethylene (LDPE) based on the total weight of the corresponding outer layer.

In a further preferred version, the weight of each outer layer is less than 8 g/m$^2$, preferable less than 6 g/m$^2$, more preferably less than 5 g/m$^2$.

In a preferred version, at least one or both of the outer layer comprise a slip agent, preferably, the slip agent is an amide-based slip agent (lubricant).

Slip agents are preferable of the amide family, such as erucamide, oleamide, oleyl-palmitamide, stearamide, behenamide and the like. Alternatively, the slip may also comprise silicon or siloxane materials.

In a further preferred version of the invention the kinetic coefficient of friction of each of the two outer layers measured upon itself (as per ASTMD1894) is less than 0.35, more preferably less than 0.3, even more preferably less than 0.25, most preferably less than 0.2.
Intermediate Layers In a preferred embodiment, the multilayer film comprises at least one intermediate layer. The multilayer film can comprise several intermediates layers. Preferably the intermedial layer(s) is (are) located between the barrier layer and one of the outer layers. There can be more than one intermediate layer be located between the barrier layer and one of the outer layers.

In the intermediate layers, typical adhesive resins like maleic anhydrite modified polyolefins may be used. Typical examples are BYNEL from Dupont and OREVAC from Arkema.

In another preferred version of the invention, an intermediate layer comprises a polyamide. For example, a preferred version of the invention is Outer layer/Intermediate layer 1/Intermediate layer 2/EVOH/polyamide/Intermediate layer 3/Outer layer or Outer layer/Intermediate layer 1/Polyamide/EVOH/Polyamide/Intermediate layer 3/Outer layer In another version of the invention, at least one intermediate layer comprises polyamide.

If a multilayer film of the present invention comprises polyamide in an intermediate layer, then preferably polyamide 6 or polyamide 6/66 is used.
General Additives well known in the art may be used in one or more layers of the present invention. Slip additives, antifog additives, polymer processing aids may be used if pertinent. Antimicrobial and/or antibacterial additives may also be used in one or more of the layers to inhibit the microbe formation. Preferably the antimicrobial or antibacterial additive is added to at least one, or both outer layers. Preferably the antimicrobial or antibacterial additive is added to the outer layer in direct contact to the product to be packed.

The antimicrobial/antibacterial additive preferably comprises silver, silver ion and/or copper. More preferably it comprises silver ion. The additive may be used in an amount of from 0.2 to 20% per weight of the corresponding layer wherein the additive is added.

In a preferable version of the invention the film does not comprise polypropylene.

The total amount of substantially non-resilient material in the multiplayer film is preferably 10% per weight or less, more preferably 7% per weight or less, even more preferably 5% per weight or less, in particular 3% per weight or less, based on the total weight of the multilayer film. Most preferably the multilayer-film does not contain any substantially non-resilient material.

The total amount of substantially non-resilient material in each outer layer is preferably 10% per weight or less, more preferably 7% per weight or less, even more preferably 5% per weight or less, in particular 3% per weight or less, based on the total weight of the corresponding outer layer. Most preferably each outer layer does not contain any substantially non-resilient material.

In a preferable version of the invention the film presents an antibacterial activity as follows; a decline of at least 20% of the population of Staphylococcus aureus held in contact with at least one of the outer layers of the film for 24 hours compared to the initial population. The measurements are made as per ISO 2196/2011 measurement of the antibacterial activity on plastics and other non-porous surfaces.

In order to increase the mechanical properties, the film may be cross-linked with one of the following methods. E-beam radiation, gamma radiation, moisture crosslinking using silane grafting compounds, peroxide crosslinking.

The film may be in tubular form or sealed at the edges or single sheet configuration. It may also be folded once or many times (as per U.S. Pat. No. 5,037,370 for example). It can also be used in the form of a series of bags, gusseted or non-gusseted, folded or not folded. Centerfold configuration is also possible.

The preferred production method for the film is the hot blown film method, which is well known in the art. Other methods like extrusion through flat cast die is also possible.

In a preferable embodiment the film is stored in a cassette prior to use, e.g. a cassette as described in U.S. Pat. No. 4,934,529.

According to a second aspect the present invention is directed to a cassette comprising a film according to the present invention for use in waste packaging applications. In a preferable embodiment a cassette as described e.g. in U.S. Pat. No. 4,934,529 is used.

According to a third aspect the present invention is directed to the use of a multilayer film according to the present invention for waste packing, wherein the film is preferably stored in a cassette.

In a preferable embodiment the film is stored in a cassette prior to use, e.g. a cassette as described in U.S. Pat. No. 4,934,529.

Mechanical Properties

The film of the present application despite its low thickness is very good in mechanical properties such as tensile strength and elongation as per ASTM D882.

In a preferred version of the invention the film has a tensile strength at break of at least 20 N/MM2 in at least one of machine and transverse direction and an elongation of at least 300% in at least one of machine and transverse directions.

EXAMPLES

A 5-layer film is produced in a commercial hot blown film line with the following recipe
Outer layer 1, 80% HDPE+ 15% EAO1+ 5% erucamide based slip masterbatch
Intermediate layer 100% ADH 1
Barrier layer EVOH 1
Intermediate layer 100% ADH1
Outer layer 2 80% HDPE+ 15% EAO+ 5% erucamide based slip masterbatch
See table 1
The thickness of the structure is 7.5/1.5/1.5/1.5/6 starting from the outer layer 1 and going to the outer layer 2.

TABLE 1

| Type | Description | Density g/cm³ |
|---|---|---|
| HDPE | HDPE homopolymer | 0.952 |
| EAO1 | Ethylene hexene copolymer produced with metallocene catalysts | 0.918 |
| ADH1 | LLDPE mod. Adhesive tie | 0.92 |
| EVOH 1 | EVOH with 32% ethylene | 1.19 |
| EVOH2 | EVOH with 29% ethylene | 1.2 |
| SNR 1 | Calcium carbonate polyethylene compound | 1.7 |
| LDPE | Low density polyethylene of density 0.924 and MFI 0.7 at 190 c., 2.16 KG | |
| SLIP | Erucamide slip masterbatch comprising 5% erucamide | |
| PA1 | Polyamide 6/66 | 1.13 |

The weight of the film is 17.3 g/m2.

Example 2

A 5-layer film is produced in a hot blown film commercial line with the following recipe
Outer layer 1, 95% HDPE+5% erucamide based SLIP masterbatch
Intermediate layer 100% ADH 1
Barrier layer EVOH 1
Intermediate layer 100% ADH1
Outer layer 2 95% HDPE+ 5% erucamide based SLIP masterbatch
The thickness of the structure is 6.5/1.5/1.5/1.5/5 starting from the outer layer 1 and going to the outer layer 2.
The weight of the material is 15.4 g/m2.

Example 3

A 5-layer film is produced in a hot blown film commercial line with the following recipe
Outer layer 1, 95% HDPE+ 5% erucamide based SLIP masterbatch
Intermediate layer 100% ADH 1
Barrier layer PA1
Intermediate layer 100% ADH1
Outer layer 2 95% HDPE+5% erucamide based SLIP masterbatch
The thickness of the structure is 3/1.5/1.5/1.5/2 starting from the outer layer 1 and going to the outer layer 2.
The weight of the material is 10.9 g/m2.

Comparative Example

A 5-layer film is produced in a hot blown film commercial line with the following recipe
Outer layer 1, 65% EAO1+ 30% SNR 1+ 5% erucamide based SLIP masterbatch
Intermediate layer 100% ADH 1
Barrier layer EVOH 2
Intermediate layer 100% ADH1
Outer layer 2 65% EAO1+ 30% SNR1+ 5% erucamide based SLIP masterbatch The thickness of the structure is 5/1.5/1.5/1.5/3 starting from the outer layer 1 and going to the outer layer 2.

The weight of the material is 12.1 g/m2.

Tests

1. Tensile strength and elongation test is done according to ASTM D 882.
2. Compression testing Test 1.

Tensile strength and elongation are measured as per ASTM D882. MD stands for machine direction, whereas TD stands for transverse direction.

| EXAMPLE | TENSILE STRENGTH (MD) | ELONGATION (MD) | TENSILE STRENGTH (TD) | ELONGATION (TD) |
|---|---|---|---|---|
| 1 | 34 | 270 | 30 | 385 |
| 2 | 37 | 245 | 30 | 365 |
| 3 | 39 | 260 | 28 | 355 |

Compression Testing

A paper core of diameter 76 mm and height 50 cm was used in order to test compression.

Around the diameter of paper core, a tubular film was placed and squeezed. The film length was measured so that the film did not overpass the upper end of the core. This test represents how easy is to put the tubular film in the cassette (so the number of film meters that can be squeezed inside).

For the comparative film comprising high amounts of SNR 7.2 meter could be used while for the films according to the invention 7.5 (film 1), 7.8 (film 2) and 8.2 (film 3) could be used.

Therefore, the ability of the innovative film to compress is better than the one of the film of prior art.

Coefficient of Friction

Coefficient of friction (COF) was measured as per ASTM D1894 (kinetic, film to film).

The comparative film has a COF of more than 0.3 at both outer layers, while the films of the invention had values of less than 0.25.

What is claimed is:

1. A multilayer film with weight less than 20 g/m$^2$ for use in malodorous item packaging, wherein the film comprises two outer layers, wherein at least one of the outer layers comprise at least 50% per weight high density polyethylene (HDPE) based on the total weight of the corresponding layer, wherein the HDPE is in a blend with an ethylene alpha olefin copolymer, wherein the film comprises at least one barrier layer comprising EVOH, and wherein the film does not contain polypropylene.

2. The multilayer film according to claim 1, wherein both outer layers comprise at least 50% per weight high density polyethylene (HDPE).

3. The multilayer film according to claim 1, wherein the ethylene alpha olefin copolymer, is a hexene or octene copolymer.

4. The multilayer film according to claim 1, wherein the film comprises or consists of the following layers:
OUTER LAYER / INTERMEDIATE LAYER 1 /BARRIER LAYER / INTERMEDIATE LAYER 3 /OUTER LAYER.

5. The multilayer film according to claim 1, wherein the film comprises or consists of the following layers:
OUTER LAYER / INTERMEDIATE LAYER 1 /INTERMEDIATE LAYER 2 /BARRIER LAYER / INTERMEDIATE LAYER 3 /INTERMEDIATE LAYER 4 /OUTER LAYER.

6. The multilayer film according to claim 1, wherein the film presents an antibacterial activity characterized by a decline of at least 20% of the population of Staphylococcus aureus held in contact with at least one of the outer layers of the film for 24 hours compared to the initial population, measured according to ISO 2196/2011 for measurement of the antibacterial activity on plastics and other non-porous surfaces.

7. The multilayer film according to claim 1, wherein a total amount of a substantially non-resilient material in the film is 30% per weight or less.

8. The multilayer film according to claim 7, wherein the total amount of substantially non-resilient material in the film is 25% per weight or less.

9. The multilayer film according to claim 7, wherein the total amount of substantially non-resilient material in the film is 20% per weight or less.

10. The multilayer film according to claim 1, wherein a total amount of a substantially non-resilient material in each outer layer is 50% per weight or less.

11. The multilayer film according to claim 10, wherein the total amount of substantially non-resilient material in each outer layer is 40% per weight or less.

12. The multilayer film according to claim 10, wherein the total amount of substantially non-resilient material in each outer layer is 30% per weight or less.

13. The multilayer film according to claim 1, wherein the film has a weight less than 18 g/m$^2$.

14. The multilayer film according to claim 13, wherein the film has a weight less than 17 g/m$^2$.

15. The multilayer film according to claim 13, wherein the film has a weight less than 16 g/m$^2$.

16. The multilayer film according to claim 13, wherein the film has a weight less than 15 g/m$^2$.

17. The multilayer film according to claim 13, wherein the film has a weight less than 14 g/m$^2$.

18. The multilayer film according to claim 13, wherein the film has a weight less than 13 g/m$^2$.

19. The multilayer film according to claim 1, wherein the weight of each outer layer is less than 8 g/m$^2$.

20. The multilayer film according to claim 19, wherein the weight of each outer layer is less than 6 g/m$^2$.

21. The multilayer film according to claim 19, wherein the weight of each outer layer is less than 5 g/m$^2$.

22. The multilayer film according to claim 1, wherein the film further comprises at least one intermediate layer comprising polyamid.

23. The multilayer film according to claim 22, wherein the polyamide is polyamide 6 or polyamide 6/66.

24. The multilayer film according to claim 1, wherein at least one or both of the outer layers comprise a slip agent.

25. The multilayer film according to claim 24, wherein the slip agent is an amide-based slip agent.

26. The multilayer film according to claim 1, wherein both outer layers have a kinetic film-to-film coefficient of friction of less than 0.35 measured according to ASTMD1894.

27. The multilayer film according to claim 26, wherein the coefficient of friction is less than 0.30.

28. The multilayer film according to claim 26, wherein the coefficient of friction is less than 0.25.

29. The multilayer film according to claim 26, wherein the coefficient of friction is less than 0.2.

30. The multilayer film according to claim 1, wherein at least one of the outer layer additionally comprises 0.5-40% per weight low density polyethylene (LDPE) based on the total weight of the corresponding outer layer.

31. The multilayer film according to claim 30, wherein both outer layers additionally comprise 0.5-40% per weight low density polyethylene (LDPE) based on the total weight of the corresponding outer layer.

32. The multilayer film according to claim 30, wherein at least one of the outer layers comprises 5-30% per weight low density polyethylene (LDPE) based on the total weight of the corresponding outer layer.

33. The multilayer film according to claim 30, wherein both outer layers comprise 5-30% per weight low density polyethylene (LDPE) based on the total weight of the corresponding outer layer.

34. A cassette comprising a film according to claim 1, for use in waste packaging applications.

35. A method of packing waste, comprising packing waste in the multilayer film according to claim 1.

36. The method according to claim 35, wherein the film is stored in a cassette.

37. The method according to claim 35, wherein the film is folded or the film is in the form of a bag.

\* \* \* \* \*